Figure 6:
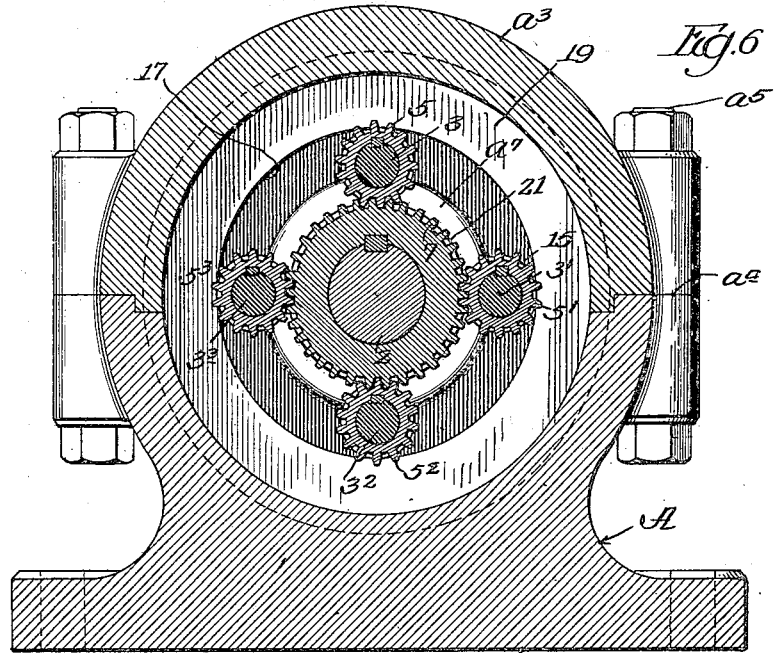
Figure 7:
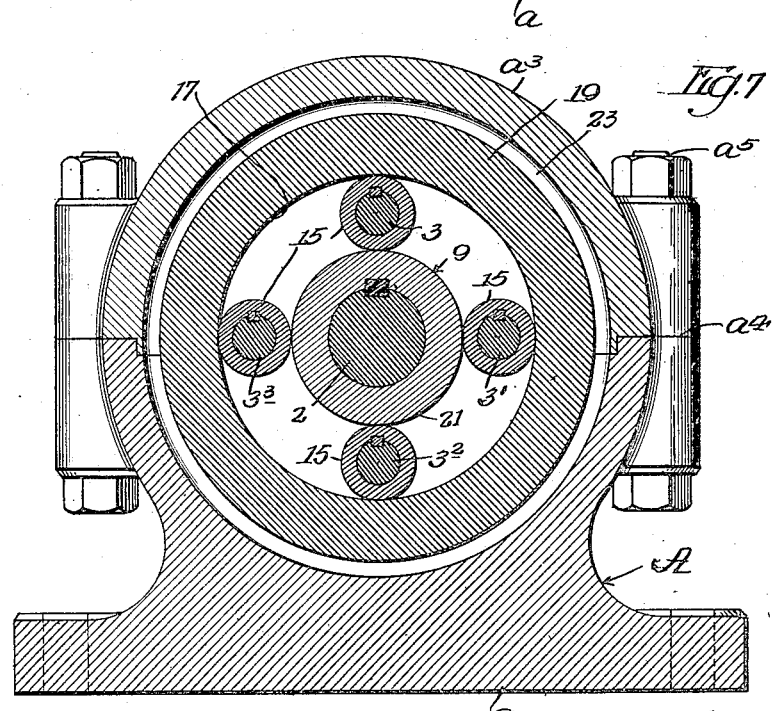

Oct. 16, 1928.
J. W. LYONS
1,688,194
DIFFERENTIAL POWER TRANSMISSION DEVICE
Filed June 25, 1928     12 Sheets-Sheet 1
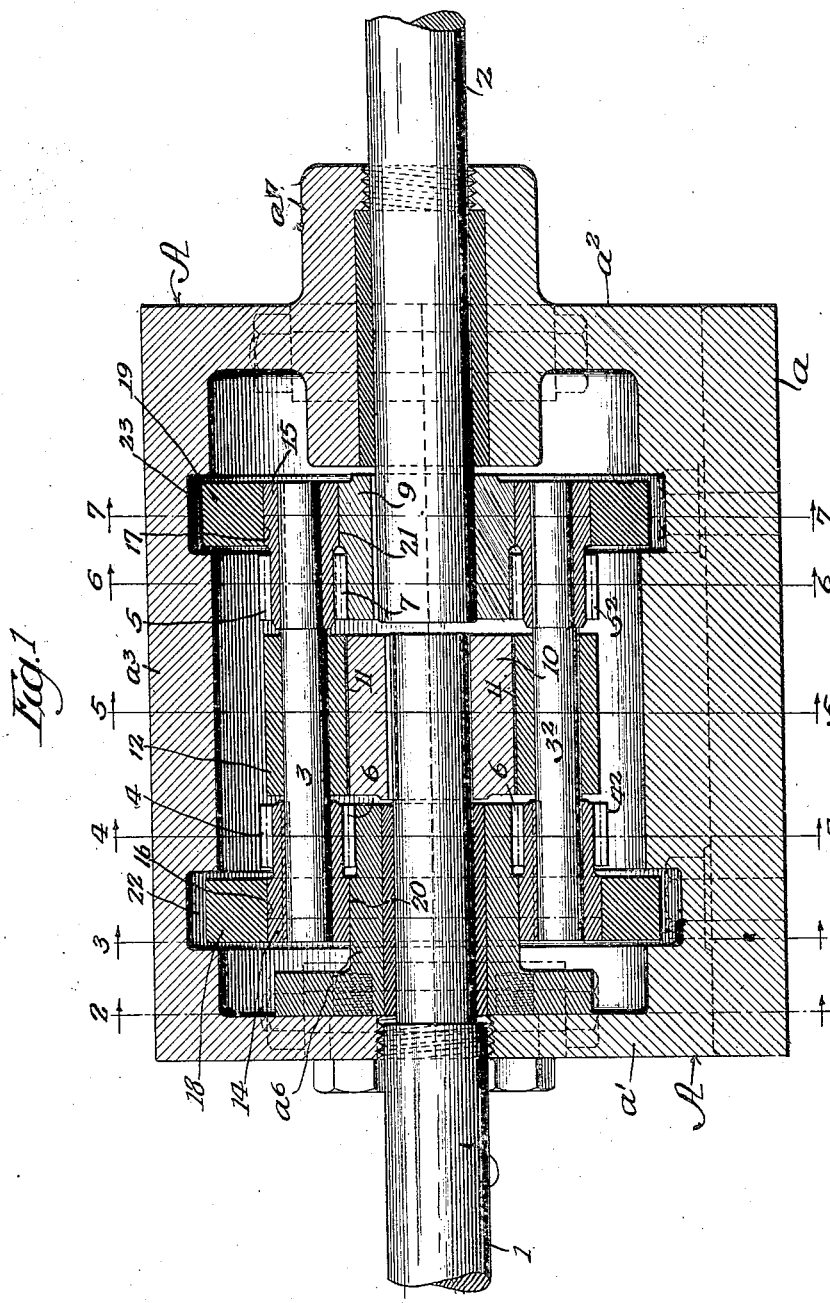
Inventor:
James W. Lyons.
By [signature]
Atty.

Oct. 16, 1928.  
J. W. LYONS  
1,688,194  
DIFFERENTIAL POWER TRANSMISSION DEVICE  
Filed June 25, 1928     12 Sheets-Sheet 2
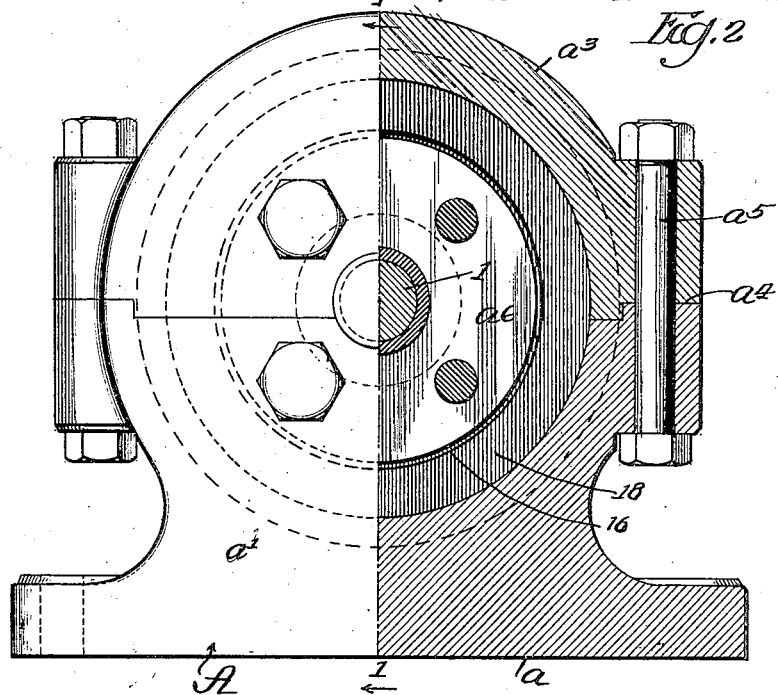
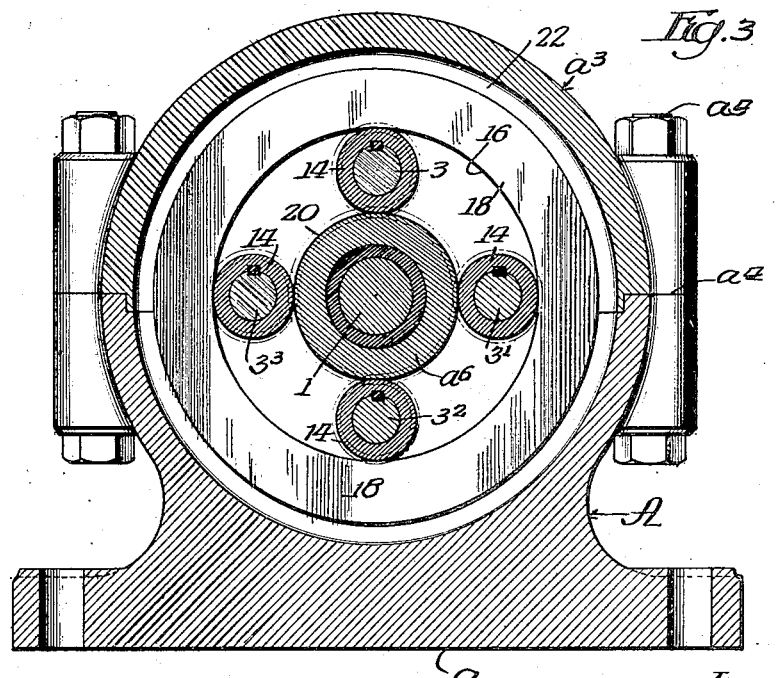
Inventor:
James W. Lyons Oct. 16, 1928.
J. W. LYONS
1,688,194
DIFFERENTIAL POWER TRANSMISSION DEVICE
Filed June 25, 1928    12 Sheets-Sheet 3
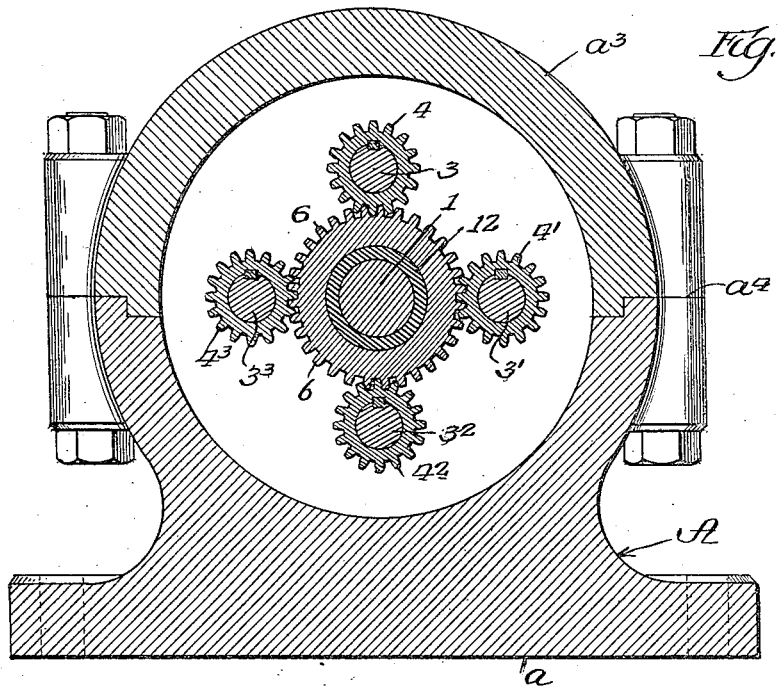
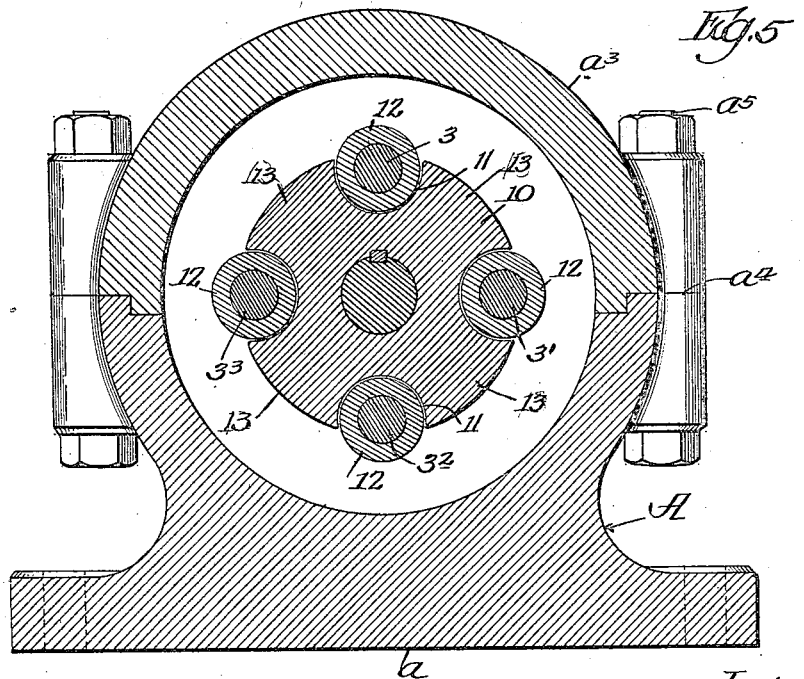
Inventor
James W. Lyons
By [signature] Atty Oct. 16, 1928.

J. W. LYONS 1,688,194

DIFFERENTIAL POWER TRANSMISSION DEVICE

Filed June 25, 1928    12 Sheets-Sheet 4

Inventor
James W. Lyons
By Geo. E. Walsh, Atty.

Oct. 16, 1928.

J. W. LYONS 1,688,194

DIFFERENTIAL POWER TRANSMISSION DEVICE

Filed June 25, 1928     12 Sheets-Sheet 6

Inventor
James W. Lyons
By G. W. E. Walder

Oct. 16, 1928.

J. W. LYONS 1,688,194

DIFFERENTIAL POWER TRANSMISSION DEVICE

Filed June 25, 1928     12 Sheets-Sheet 7

Inventor
James W. Lyons
By [signature], Atty.

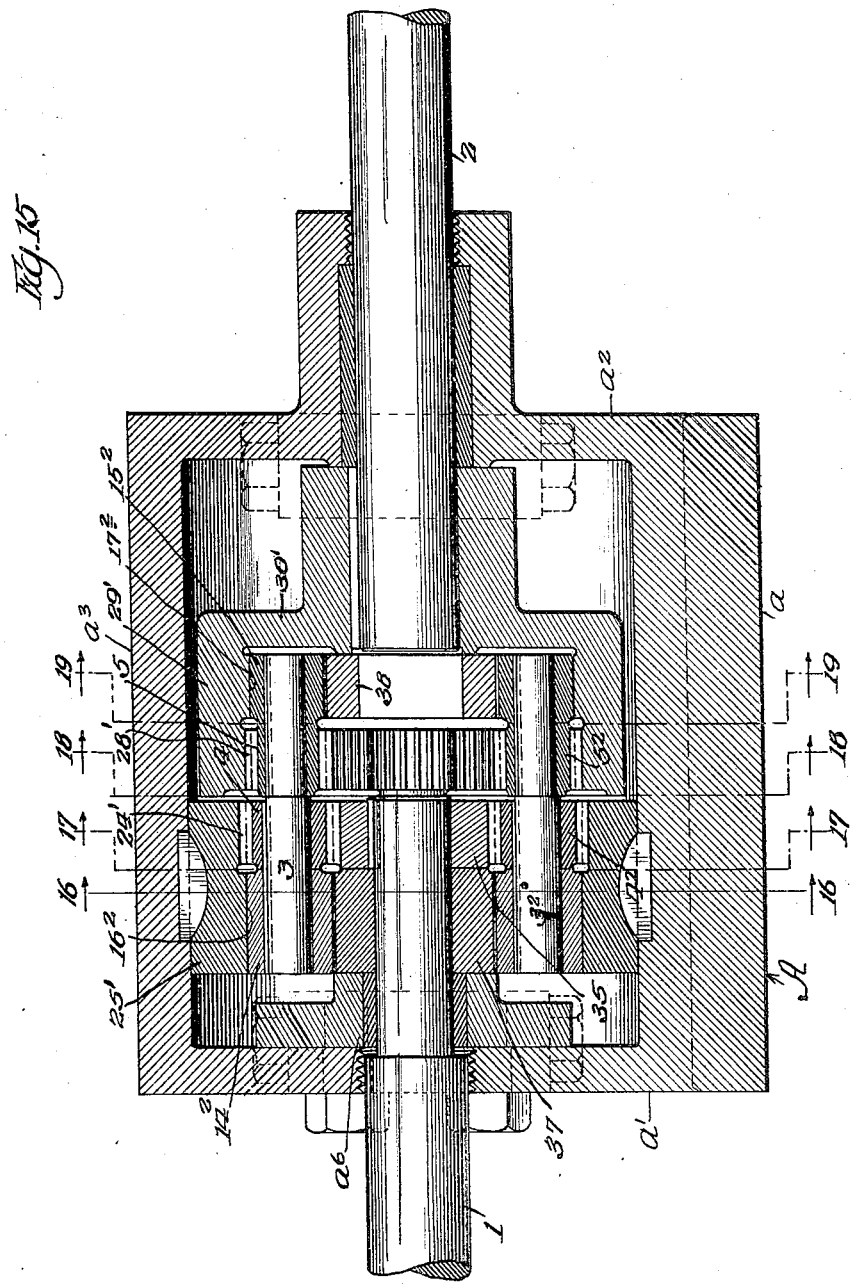

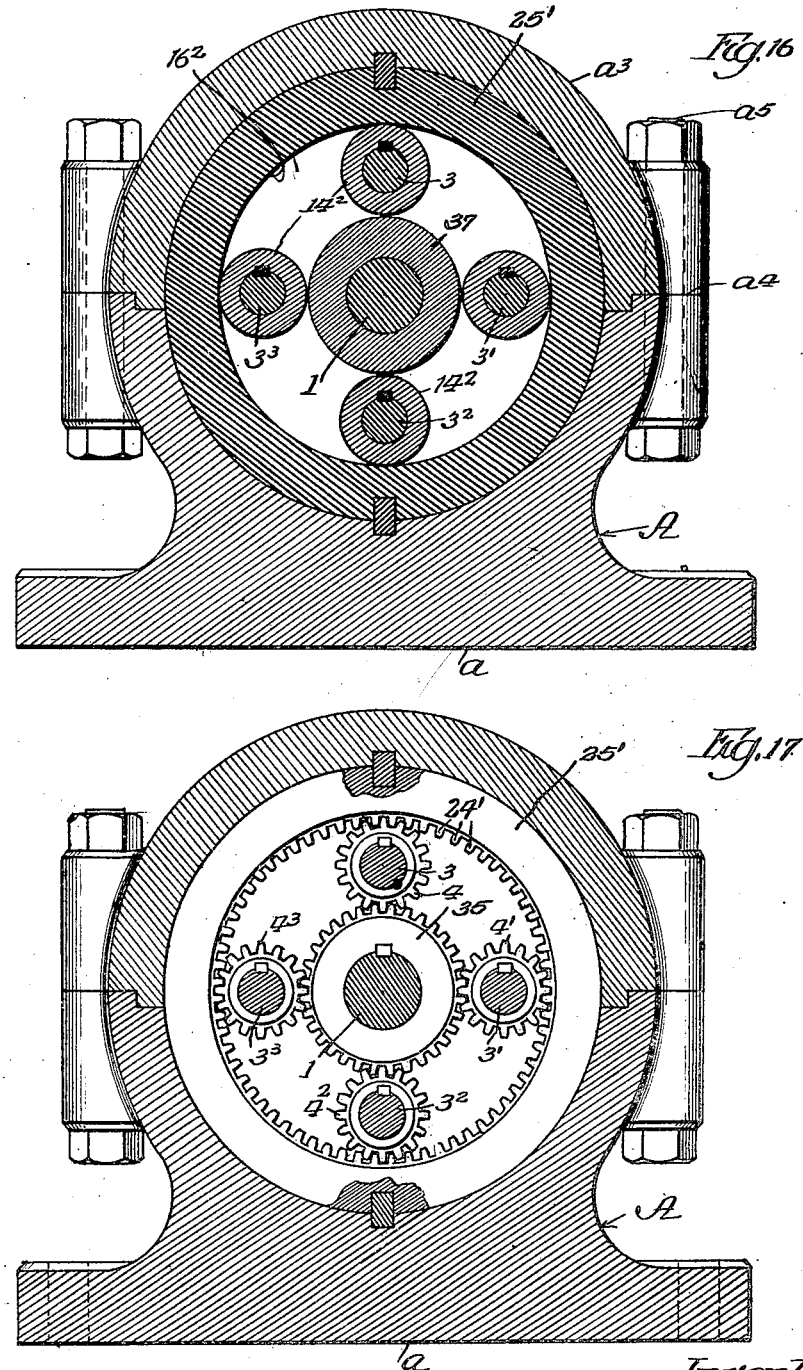

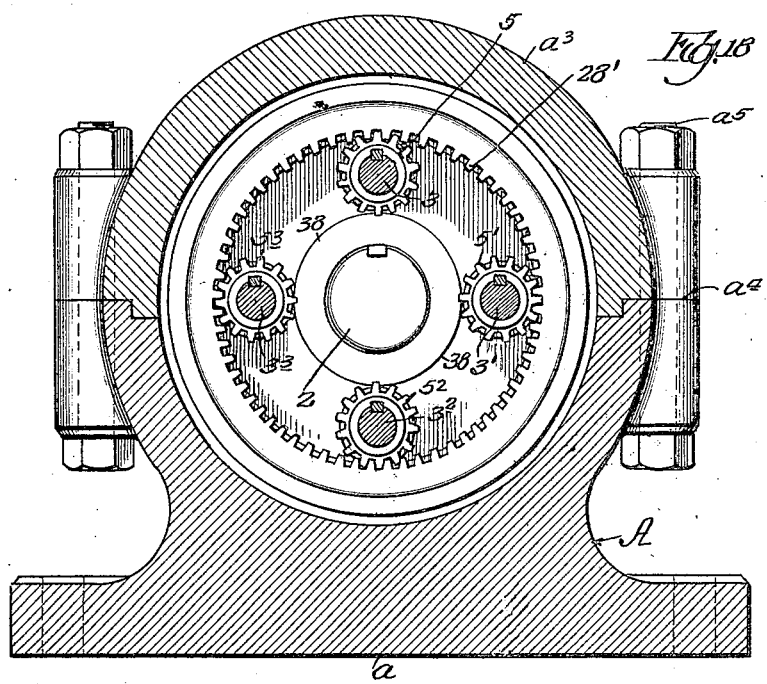
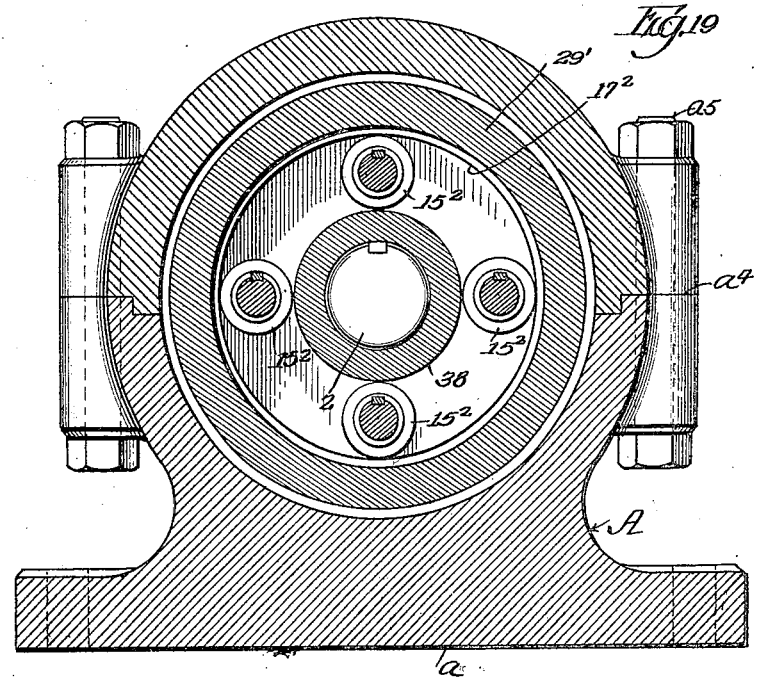

Oct. 16, 1928.
J. W. LYONS
1,688,194
DIFFERENTIAL POWER TRANSMISSION DEVICE
Filed June 25, 1928     12 Sheets-Sheet 12
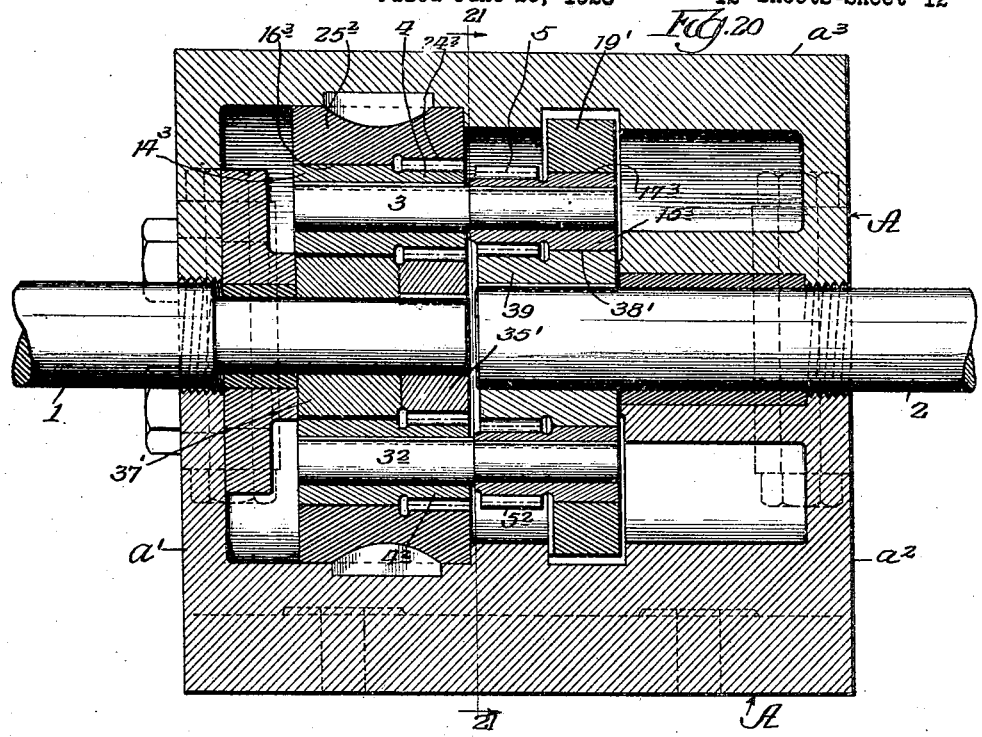
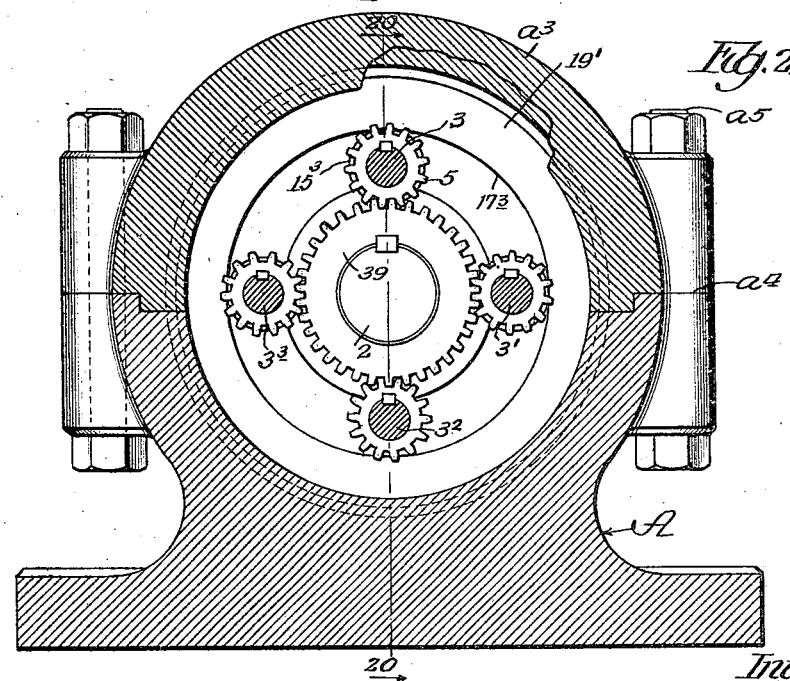
Inventor
James W. Lyons Patented Oct. 16, 1928.

1,688,194

UNITED STATES PATENT OFFICE.

JAMES W. LYONS, OF OAK PARK, ILLINOIS.

DIFFERENTIAL-POWER TRANSMISSION DEVICE.

Application filed June 25, 1928. Serial No. 287,921.

This invention relates to differential power transmission devices of the general type comprising rotatable members mounted in axial alignment with each other, and comprising a first member adapted to be power driven, and a second member, transmission shafts mounted in spaced relation to said rotatable members so as to permit planetary movement thereof about said rotatable members and also on their own axes, means rendered operative by rotation of said first rotatable member for imparting planetary movement to said transmission shafts about said rotatable members and also on their own axes constructed and arranged to permit outward movement of said transmission shafts under centrifugal force, and driving connection between said transmission shafts and the second rotatable member.

The object of the present invention is to provide a differential power transmission device of the general type specified in which the means for imparting rotation to the transmission shafts and from said transmission shafts to the second rotatable member comprises intermeshing gears and means rendered operative by centrifugal force produced by planetary rotation of said transmission shafts about said rotatable members for effecting and maintaining pitch-line engagement of said gears in operation.

To effect the objects of the invention, a transmission device embodying my invention and improvements comprises the various features, combinations of features and details of construction hereinafter described and claimed.

Figure 8:
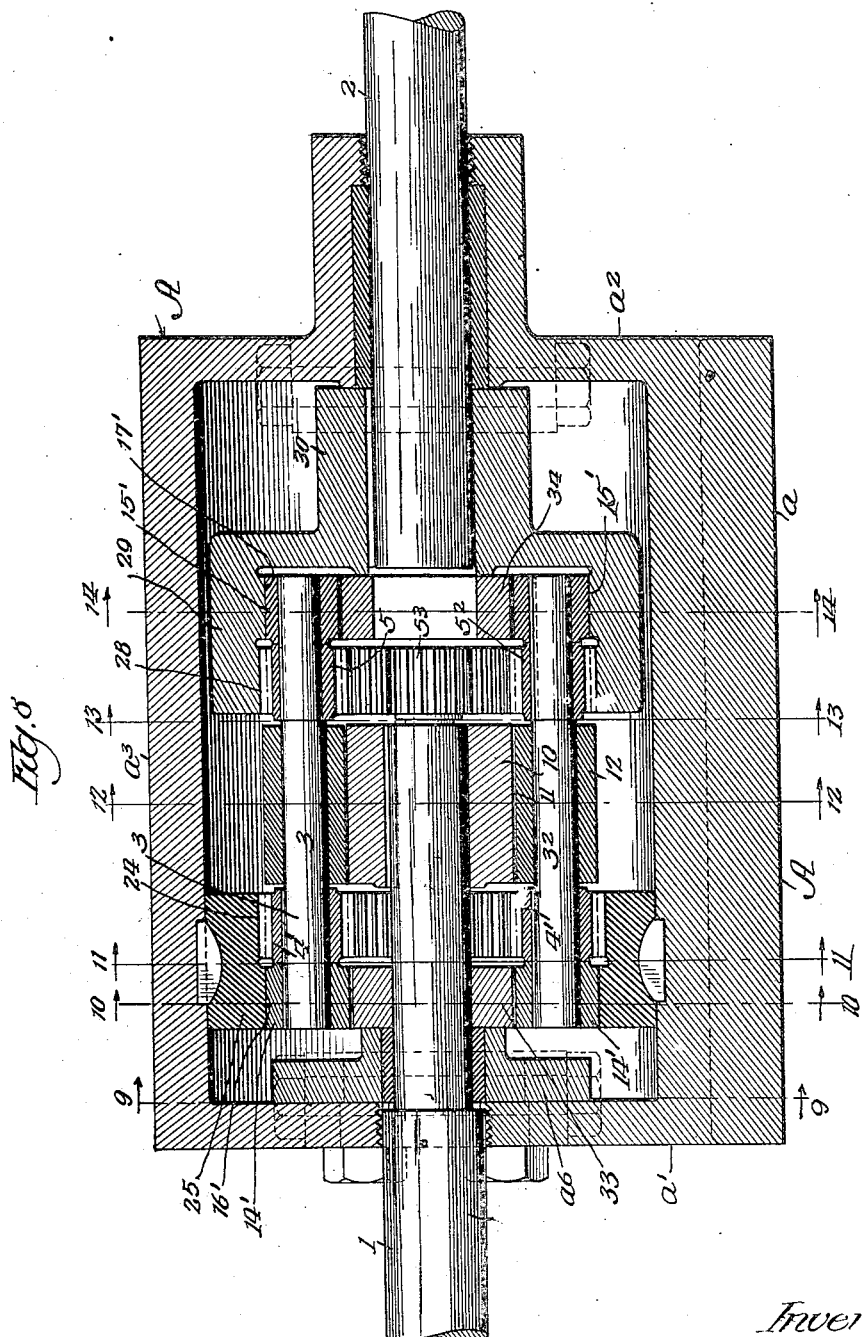
Figure 9:
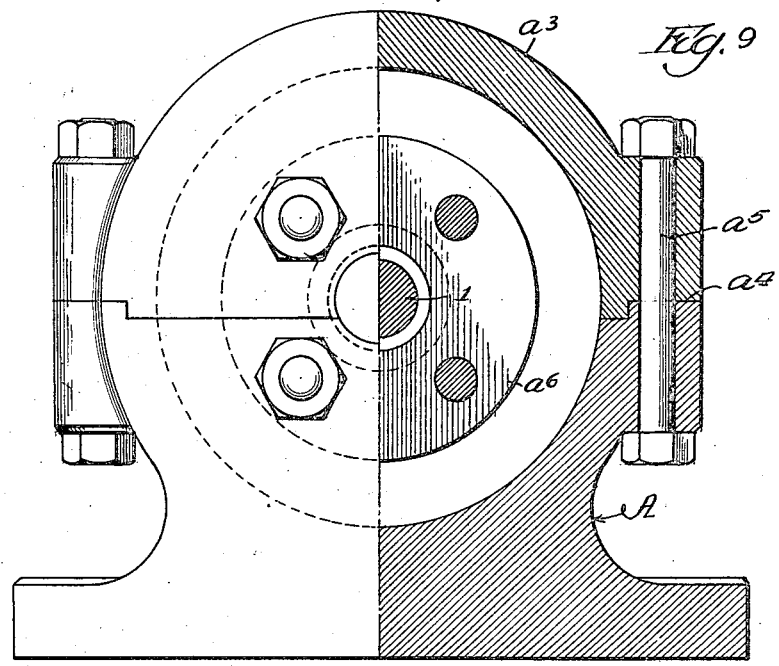
Figure 10:
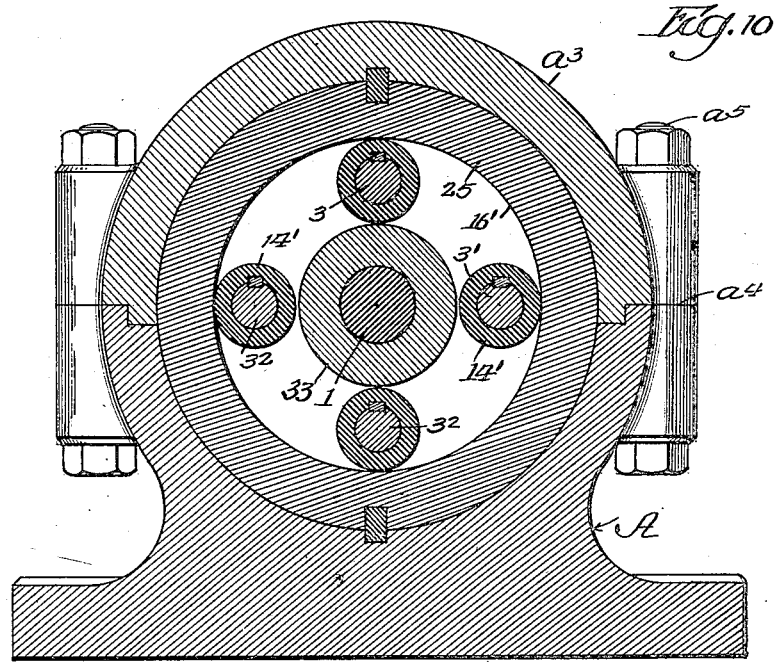
Figure 11:
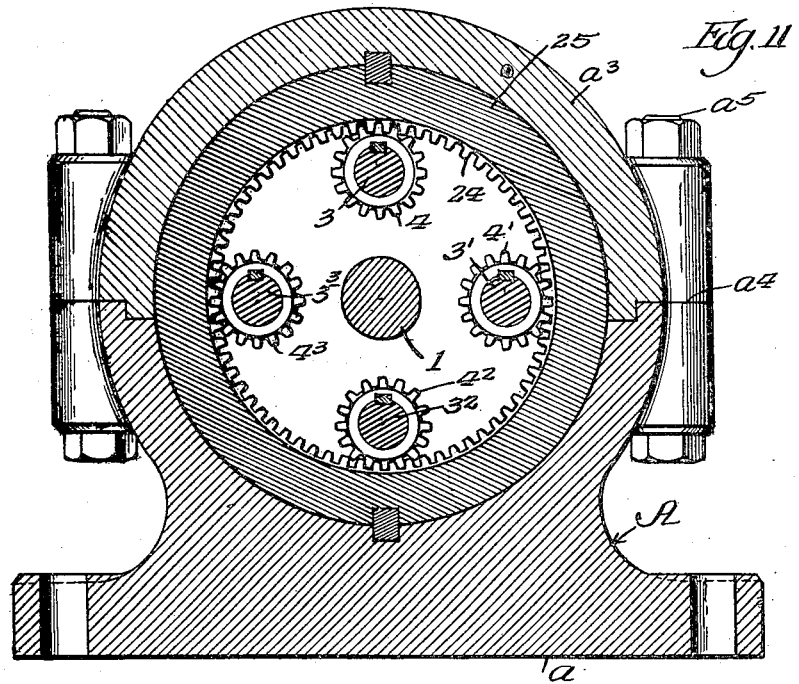
Figure 12:
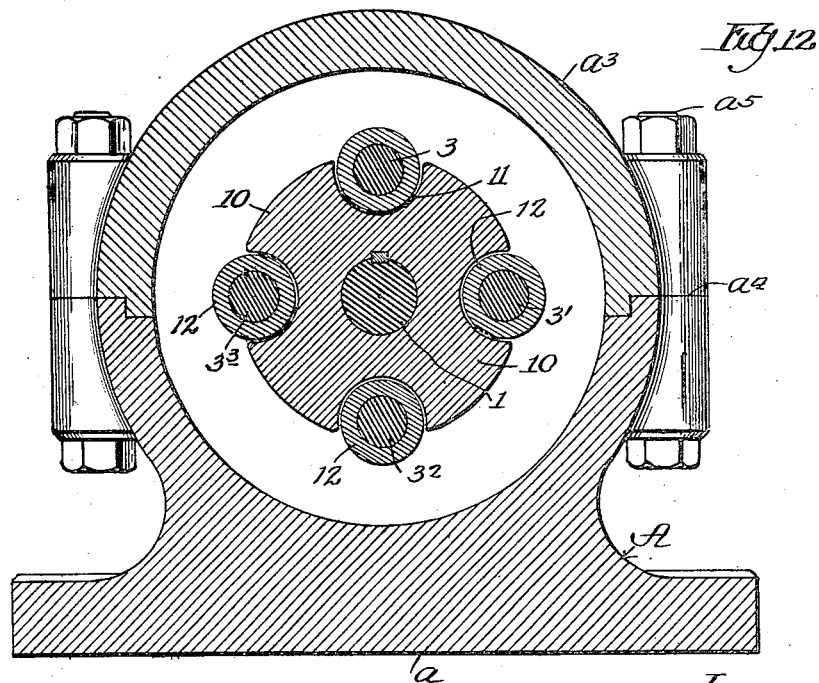
Figure 13:
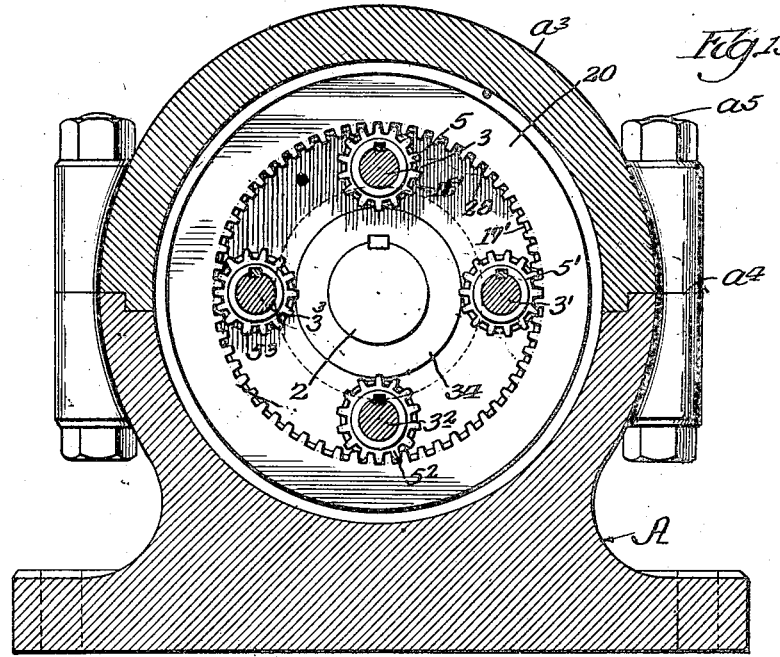
Figure 14:
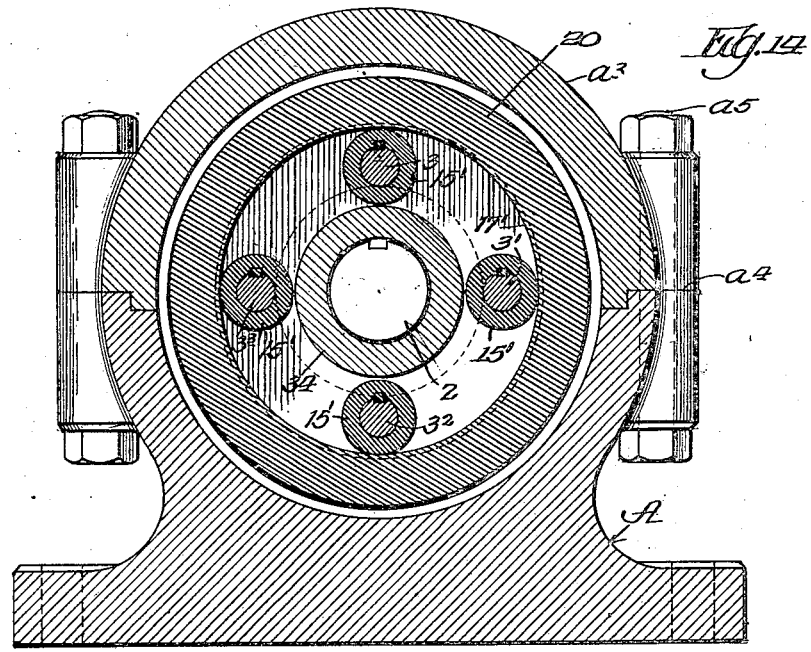

In the acompanying drawings, in which my invention is fully illustrated:

Figure 1 is a sectional elevation of a power transmission device embodying my invention and improvements, the section being taken substantially on line 1—1 of Fig. 2;

Figures 2, 3, 4, 5, 6 and 7 are sectional elevations substantially on the lines 2—2, 3—3, 4—4, 5—5, 6—6 and 7—7 of Fig. 1, respectively;

Figure 8 is a view substantially similar to Fig. 1, of a modified form of transmission device embodying my invention and improvements.

Figures 9, 10, 11, 12, 13 and 14 are sectional elevations, the sections being substantially on the lines 9—9, 10—10, 11—11, 12—12, 13—13 and 14—14 of Fig. 8, respectively;

Figure 15 is a view substantially similar to Fig. 1, illustrating still another modification.

Figures 16, 17, 18 and 19 are sectional elevations, substantially on the lines 16—16, 17—17, 18—18 and 19—19 of Fig. 15, respectively;

Figure 20 is a view substantially similar to Fig. 15, illustrating a modification of the transmission device shown therein, the section being substantially on the line 20—20 of Fig. 21; and Figure 21 is a sectional elevation taken on the line 21—21 of Fig. 20.

Describing the invention with particular reference to the drawings and referring, in the first instance, to Figures 1 to 7, inclusive, A designates the frame of the device as a whole, comprising a base portion $a$ adapted to be bolted or otherwise secured to a suitable foundation or support, end walls $a'$, $a^2$, and side walls $a^3$ which, for purposes presently apparent are constructed and arranged to form an enclosed chamber in which the operative parts of the device and parts directly associated therewith are mounted.

To provide for assembling the transmission device and to render the parts thereof accessible, the frame or casing A is made in separate upper and lower parts, the parting line being designated by the reference character $a^4$, said parts being detachably connected by means of bolts $a^5$, in a usual manner.

As shown, my improved power transmission device is designed and adapted for imparting rotation from a shaft 1, which may exemplify the shaft of an electric motor or other rotatable power driven member, to a shaft 2, which may exemplify any rotating part, at a differential rate of speed for R. P. M. as compared with the shaft or other rotatable member 1. As shown, also, the rotatable members 1 and 2 are mounted in bearings formed in hubs or bosses $a^6$, $a^7$, supported on the end walls $a'$, $a^2$, respectively, of the frame or casing A, the bearing hub or boss $a$ being bolted or otherwise detachably secured to the end wall $a'$, and the hub or boss $a^7$ being formed integral with the end wall $a^2$.

For purposes of convenient reference, the shafts or rotatable members 1 and 2 will be designated, respectively, the first and the second rotatable members.

What I now consider the preferable embodiment of my invention comprises a plurality—as shown four—transmission shafts 3, 3', 3² and 3³, mounted in symmetrical spaced relation to the rotatable members 1 and 2, so as to permit planetary movement thereof about said rotatable members and also on their own axes, keyed or otherwise rigidly secured to which are sets of gears, designated respectively, 4, 4', 4² and 4³, and 5, 5', 5² and 5³, which, in operation, are adapted, respectively, to intermesh with gears 6 and 7. The gear 6 is secured to and, as shown, is formed integral with the bearing hub or boss $a^6$, in which the first rotatable member is mounted, and the gear 7 is formed on a collar 9 keyed or otherwise secured to the second rotatable member so as to rotate therewith.

As shown, the gears 4 to 4³ and 5 to 5³ are spur gears but, my invention contemplates equally the use of other forms of gears, if desired.

The transmission shafts 3 to 3³ have operative connection with the first rotatable member 1, constructed and arranged to impart planetary movement thereto about the rotatable members 1 and 2 in the same direction as the first rotatable member 1, while, at the same time, permitting said shafts to move outwardly away from the rotatable members under centrifugal force due to rotation at high speed of said first rotatable member.

Obviously, due to engagement of the gears 4 to 4³ on the transmission shafts 3 to 3³ with the teeth of the fixed gear 6, planetary rotation of said transmission shafts about the rotatable members 1 and 2 will operate to impart rotation to said transmission shafts on their own axis in the same direction as the first rotatable member 1, and also that such axial rotation of said transmission shafts through engagement of the gears 5 to 5³ with the gear 7 on the rotatable member 2, will impart rotation to said rotatable member 2, but in a direction opposite to the direction of rotation of the first rotatable member 1.

With the described construction, if the gears 4 to 4³ and 5 to 5³ are of the same size, no motion will be imparted to the second rotatable member by rotation of the first member, whereas, if said sets of gears are of different sizes, rotation of the first rotatable member will impart movement to the second rotatable member at a rate of speed or R. P. M. different from that of the first member either in the same or opposite direction from said first member, as the gears 5 to 5³ are smaller or larger than the gears 4 to 4³, relatively small gears 5 to 5³ imparting rotation to said second rotatable member in the same direction as the first rotatable member, and relatively large gears 5 to 5³, imparting rotation to said second rotatable member in a direction opposite to the first rotatable member.

The relative diameters of the gears 6 and 7 and of the gears 4 to 4³ and 5 to 5³, respectively, are the controlling factors in the direction and rate of rotation or R. P. M. of the second rotatable member relative to the first rotatable member.

Specifically and preferably, the manner of mounting the transmission shafts 3 to 3³ is as follows: Secured to the first rotatable member 1 is what may be designated a spider 10, see particularly Figs. 1 and 5, which is provided with peripheral cradles or recessed seats 11, and adjusted over the transmission shafts 3 to 3³ between the sets of gears 4 to 4³ and 5 to 5³ are bearing members 12 consisting, as shown, of sleeves made of suitable bearing metal, preferably having low frictional resistance, and which are fitted to the cradles or recessed seats 11 formed in the spider 10 with slight clearance.

In operation, planetary rotation about the rotatable members 1 and 2 is imparted to the bearing members 12 and with them to the transmission shafts 3 to 3³ by rigid parts 13 of the spider 10 which define the cradles or recess seats 11 and which extend between adjacent bearing members 12, the relation being preferably such that the initial action of the spider—as rotation of the first rotatable member begins—will be in the nature of a wedging action tending to force the bearing members 12 and with them the transmission shafts 3 to 3³ outwardly, such wedging action being superseded by centrifugal force as the speed of the first rotatable member increases.

An essential feature of the present invention is the provision of means for effecting and maintaining pitch-line engagement of intermeshing gears, in operation, thus maintaining at all times the theoretical engagement of said gears both adapted to reduce the friction between said gears and wear on said gears to a minimum.

In what I now consider the preferable embodiment of my invention, I effect and maintain pitch-line engagement of intermeshing gears by means as follows: Secured to the shafts 3 to 3³ so as to rotate therewith are rollers 14 and 15, the diameters of which, respectively, are equal to the pitch-line diameters of the gears 4 to 4³ and 5 to 5³, respectively, and opposed to which are circular treads 16 and 17 formed, respectively, on what may be designated floating rings 18 and 19, the relation being such that outward movement of the transmission shafts 3 to 3³ under centrifugal force due to rotation of the first rotatable member, will effect contact of the cylindrical surfaces of the rollers 14 and 15 with the treads 16 and 17 of the rings 18 and 19, respectively.

In the preferable construction shown, also, the treads 16 and 17 on the floating rings 18 and 19 are maintained concentric with the axis of rotation of the rotatable members 1 and 2 by means of cylindrical surfaces 20 and 21 formed on the fixed bearing hub or boss $a^6$ and on the sleeve or collar 9 keyed to the rotatable member 2, the cylindrical surface 20 being sufficiently smaller, say .002 of an inch, than the diameter of a circle inscribed within and tangent to the rollers 14 when all thereof are in contact with the tread 16, to provide sufficient clearance between the adjacent sides of the rollers 14 and surface 20 to prevent contact thereof in operation, which would tend to generate heat in the parts due to pressure. In like manner, the cylindrical surface 21 is sufficiently smaller than the diameter of a circle inscribed within and tangent to the rollers 15 when in contact with the tread 17, say .002 of an inch, to provide sufficient clearance between said rollers 15 and surface 21, to prevent contact of the surface of the rollers 15 with the cylindrical surface 21 in operation.

The rings 18 and 19 are respectively supported by the rollers 14 and 15, being free to turn in either direction with said rollers, and being made of such thickness that their outer portions will extend into recesses 22 and 23 formed in proper position in the casing A and so proportioned that they will prevent disengagement of said rings from their respective supporting rollers.

The invention contemplates that the operative parts of the transmission device shall run in a suitable lubricant and, to this end, the chamber in the frame or casing A of the device, in which the operative parts of the device are mounted, will be filled with a suitable lubricant to a level slightly below the lower side of the bearing for the rotatable member 1 or 2, whichever in a given case, is the larger.

While I consider the embodiment of my improved transmission device shown in Figs. 1 to 7 of the drawings and heretofore described, as the preferable form thereof, I do not desire nor intend to limit myself to the particular construction shown, as the device admits of different modification within the scope of contemplation of my invention. For the purpose of clear and definite illustration, I have, in the drawings, shown 3 different modifications, which will now be described, and which, for purposes of convenient reference will be referred to as the first, second and third modifications, respectively.

As regards its usual features, and excepting as hereinafter particularly described and pointed out, the first modification, shown in Figs. 8 to 14, inclusive, of the drawings, is substantially similar in construction and operation to the preferred form of transmission shown in Figs. 1 to 7, inclusive, and will readily be understood by skilled mechanics from an inspection of the drawings—particularly in connection with the description of the preferred form of the device—without a further description thereof in detail, parts which are the same or substantially similar to corresponding parts of the preferred form of the device, being designated by the same reference characters.

In the first modification, the transmission shafts 3 to $3^3$ instead of being driven or rotated by a fixed central gear with which the gears 4 to $4^3$ on the transmission shafts intermesh, as in the preferred form of the device, are driven or rotated axially by means of engagement of the gears on said transmission shafts with an internal gear 24 formed on a ring 25 secured in fixed position within the chamber formed by the frame or casing A of the device and which surrounds the transmission shafts, with which the gears 4 to $4^3$ on said transmission shafts intermesh.

With the described construction, it is obvious that when planetary movement is imparted to the transmission shafts about the first and second rotatable members 1 and 2— by the spider 10 and the bearing members 12—engagement of the gears 4 to $4^3$ with the internal gear 24 will impart rotation to the transmission shafts 3 to $3^3$, but in a direction opposite to that in which they will be rotated when driven from a centrally positioned gear, as in the preferred form of the device.

As in the preferred form of the device, pitch-line engagement of the gears 4 to $4^3$ on the transmission shafts with the internal gear 24 is defined by contact of rollers 14' on the transmission shafts with an internal tread 16' formed on the ring 25, the diameter of the rollers 14' being equal to the pitch diameter of the gears 4 to $4^3$ and the diameter of the tread 16' being equal to the pitch diameter of the internal gear 24.

In accordance with said first modification, also, rotation is imparted to the second rotatable member from the transmission shafts by means of the gears 5 to $5^3$ secured thereto which intermesh with an internal gear 28 formed on a flange 29 forming part of a head 30, keyed or otherwise secured to the second rotatable member 2. Pitch line engagement of the gears 5 to $5^3$ with said internal gear 28 is maintained by a set of rollers 15' on the transmission shafts which are adapted to run in contact with an internal tread 17' formed on the flange 29, the diameter of the rollers 15' being equal to the pitch diameter of the gears 5 to $5^3$ and the diameter of the tread 17' being equal to the pitch diameter of the internal gear 28.

In said first modification, also, the bearing hub or boss $a^6$, instead of extending beneath the rollers 14' and the gears 4 to $4^3$, terminates substantially in line with the proximate side of the ring 25. Also, the collar 9 on which the gear 7 which drives the second rotatable member, is omitted and mounted in the spaces within the rollers 14' and 15' are rollers 33 and 34, the diameters of which, respectively, are sufficiently smaller, say .002 of an inch than the diame ters of circles inscribed within and tangent to the rollers 14' and 15'—when in contact with their respective treads 16' and 17'—to provide adequate clearance between the treads of the rollers 33 and 34 and the rollers 14' and 15' respectively, thus eliminating heat due to pressure between opposed rollers in operation.

The transmission shafts 3 to $3^3$ are mounted in bearing sleeves 12 of suitable bearing metal and planetary rotation about the first and second rotatable members is imparted to said transmission shafts by means of a spider 10 secured to the first rotatable member 1, which is provided in its perimeter with cradles or recessed seats 11, in which the bearing sleeves 12 are seated and confined, all substantially as in the preferred form of the device.

In the second modification, see particularly Figs. 15 to 19, inclusive, the spider 10 and the bearing sleeves 12—Figs. 1 to 7 and 9 to 14—for mounting the transmission shafts 3 to $3^3$ and for imparting planetary rotation thereto about the first and second rotatable members 1 and 2, are entirely dispensed with and the means for mounting and for imparting planetary rotation to said transmission shafts about the first and second rotatable members and upon their own axes are as follows: Secured to the transmission shafts 3 to $3^3$ are sets of gears 4 to $4^3$ and 5 to $5^3$, and sets of rollers $14^2$ and $15^2$, said rollers being arranged at the remote sides of the gears 4 to $4^3$ and 5 to $5^3$, and being adapted, respectively, to engage treads $16^2$ and $17^2$ formed, respectively, on a ring 25' secured in fixed position within the chamber defined by the frame or casing A of the device, and on a flange 29' formed on a head 30' secured to the second rotatable member 2.

The gears 4 to $4^3$ are adapted to engage the teeth of a gear 35 keyed or otherwise secured to the first rotatable member 1, which will operate, in an obvious manner, to impart axial rotation to said gears 4 to $4^3$ and thus to the transmission shafts 3 to $3^3$. Pitch-line engagement of said gears is defined by contact of the rollers $14^2$ with the tread $16^2$, the diameters of the rollers $14^2$ being equal to the pitch diameters of the gears 4 to $4^3$, and the diameter of the internal tread $16^2$ being equal to the pitch diameter of the gear 35 plus twice the pitch diameter of a gear 4 to $4^3$. Also planetary rotation is adapted to be imparted to the transmission shafts 3 to $3^3$ and to the gears 4 to $4^3$ and 5 to $5^3$ about the rotatable members 1 and 2 by engagement of the gears 4 to $4^3$ with an internal gear 24' on the ring 25'. The pitch diameter of the internal gear 24' is equal to the diameter of the tread $16^2$, which defines pitch-line engagement of the gears 4 to $4^3$ with said internal gear 24' and also with the gear 35.

As shown, also, rotation is adapted to be imparted to the second rotatable member 2 by engagement of the gears 5 to $5^3$ on the transmission shafts with an internal gear 28' formed on the inner surface of the flange 29' of the head 30' secured to said second rotatable member, pitch-line engagement of said gears being defined by contact of the rollers $15^2$ on the transmission shafts with the internal tread $17^2$ on the flange 29'. The diameter of the rollers $15^2$ is equal to the pitch diameters of the gears 5 to $5^3$ and the diameter of the tread $17^2$ is equal to the pitch diameter of the internal gear 28'.

As in the first modification shown in Figs. 8 to 14, inclusive, the bearing hub or boss $a^6$ terminates substantially even with the proximate side of the ring 25' and mounted in the space between the end of said hub or boss and the adjacent face of the gear 35, is a roller 37, the diameter of which is slightly smaller, say .002 of an inch, than the diameter of a circle inscribed within and tangent to the rollers $14^2$ when said rollers are in contact with the tread $16^2$ on the ring 25'.

As shown, also, a roller 38 is mounted in the space within the rollers $15^2$, the diameter of said roller being slightly less, say .002 of an inch, than the diameter of a circle inscribed within and tangent to the rollers $15^2$ when said rollers are in contact with the tread $17^2$.

With the described construction, it is obvious that the roller 37 and 38 on the first and second rotatable members, respectively, by contact with the rollers $14^2$ and $15^2$, respectively, on the transmission shafts, will support the transmission shafts 3 to $3^3$ in positions corresponding substantially to pitch line engagement of the gears 4 to $4^3$ and 5 to $5^3$ with the gears 35 and 28' respectively, when in positions of rest.

The third modification shown in Figs. 20 and 21 of the drawings, is substantially similar to the second modification shown in Figs. 15 to 19, inclusive, of the drawings, excepting that the second rotatable member 2 instead of being driven by means of an internal gear, is driven by means of a centrally positioned gear secured to said rotatable member, with which the gears 5 to $5^3$ on the transmission shafts 3 to $3^3$ engage, and pitch-line engagement of said gears is defined by a floating ring provided with an internal tread opposed to rollers on the transmission shafts, substantially as in the preferred form of the device. Contact of the rollers on the transmission shafts with the tread on said ring is adapted to be effected by centrifugal force generated by planetary rotation of the transmission shafts about the first and second rotatable members, substantially as in the preferred form of the device shown in Figs. 1 to 7, inclusive.

The described method of driving the second rotatable member 2 renders the flanged head 30 unnecessary and in the third modification it is entirely dispensed with.

Describing said modification with particular reference to Figs. 20 and 21, 1 and 2 designate the first and second rotatable members, respectively, 3 to $3^3$ transmission shafts, 4 to $4^3$ and 5 to $5^3$ sets of gears secured to said transmission shafts, 35' the gear on the first rotatable member with which the gears 4 to $4^3$ on the transmission shafts intermesh, $25^2$ the ring secured within the chamber defined by the frame or casing A on which the tread $16^3$ and the internal gear $24^2$ are formed, $14^3$ rollers on the transmission shafts adapted to contact with the tread $16^3$ which define pitch-line engagement of the gears 4 to $4^3$ with the gear 35' on the first rotatable member and with the internal gear $24^2$, 39 the gear secured to the second rotatable member with which the gears 5 to $5^3$ on the transmission shafts intermesh and 19' the floating ring formed on which is a tread $17^3$ contact of the rollers $15^3$ on the transmission shafts with which, define pitch-line engagement of the gears 5 to $5^3$ on the transmission shafts with the gear 39, and 37' and 38' are rollers mounted within the rollers $14^3$ and $15^3$ respectively, adapted to maintain the transmission shafts 3 to $3^3$ in positions corresponding substantially to pitch-line engagement of the gears 4 to $4^3$ and 5 to $5^3$ with the gears 35' and 39, respectively, in positions of rest.

Outer members provided with treads which co-operate with rollers on the transmission shafts to define pitch-line engagement of intermeshing gears, are essential features of my improved transmission device and are always present in some form in any embodiment thereof. In some cases, however, where the spider 10, and the bearing members 12 for the transmission shafts are sufficiently long and said bearing members and the seats or cradles therefor in the spider are properly proportioned, the members positioned within the spaces defined by the rollers 14 and 15 on which the treads 20 and 21 which, respectively, co-operate with said rollers to centralize the transmission shafts and prevent them and the gears 4 to $4^3$ and 5 to $5^3$ from falling inwardly and wedging into the teeth of gears positioned within the same, may be dispensed with, and my invention contemplates such a construction, if desired.

I claim:

1. In a differential power transmission device, the combination of rotatable members mounted in axial alignment with each other, comprising a first member adapted to be power driven and a second member, transmission shafts mounted in spaced relation to said rotatable members so as to permit planetary movement thereof about said rotatable members and also rotation on their own axes, means rendered operative by rotation of said first rotatable member for imparting planetary rotation to said transmission shafts about said rotatable members and also on their own axes, constructed and arranged to permit movement of said transmission shafts outwardly relatively to said rotatable members under centrifugal force, intermeshing gears on said transmission shafts and said second rotatable member, and means rendered operative by centrifugal force produced by planetary rotation of said transmission shafts for effecting and maintaining pitch-line engagement of said gears in operation.

2. A differential power transmission device as specified in claim 1, in which the means for maintaining pitch-line engagement of the gears which drive said second rotatable member comprises rollers on said transmission shafts and a part provided with an internal tread opposed to said rollers, the relation being such that contact of said rollers with said tread will define pitch-line engagement of said gears, and such also that, in operation, centrifugal force produced by planetary rotation of said transmission shafts will effect and maintain contact of said rollers with said tread.

3. A differential power transmission device as specified in claim 1, in which the means for maintaining pitch-line engagement of the gears which drive said second rotatable member comprises rollers on said transmission shafts, and parts provided with internal and external cylindrical treads, respectively, opposed to said rollers and positioned outside and inside, respectively, thereof, the relation being such that contact of said rollers with said outer internal tread will define pitch-line engagement of said gears, and such also that in operation, centrifugal force produced by planetary rotation of the transmission shafts will effect and maintain engagement of the rollers on said transmission shafts with said outer, internal tread, and the external tread on the part positioned inside of the transmission shafts being sufficiently smaller than the diameter of a circle inscribed within and tangent to the rollers opposed thereto when said rollers are in contact with the outer internal tread to provide desired clearance between said rollers and said external tread.

4. In a differential power transmission device, the combination of rotatable members mounted in axial alignment with each other, comprising a first member adapted to be power driven, and a second member, transmission shafts mounted in spaced relation to said rotatable members so as to permit planetary movement thereof about the same and also rotation on their own axes, means rendered operative by rotation of said first rotatable member for imparting planetary rotation to said transmission shafts about said rotatable members and also on their own axes constructed and arranged to permit movement of said transmission shafts outwardly relative to said rotatable members under centrifugal force, intermeshing gears on said transmission shafts and said second rotatable member, sets of rollers on said transmission shafts, parts provided with internal treads opposed to and which surround said sets of rollers, respectively, the relation being such that said treads will limit outward movement of said transmission shafts under centrifugal force and such also that contact of one of said sets of rollers with their opposed tread will define pitch-line engagement of the gears for driving said second rotatable member.

5. A differential transmission device as specified in claim 4, in which the intermeshing gears which drive the second rotatable member comprise an external gear secured thereto and positioned in the space within the set of gears on the transmission shafts with which it engages, and the part on which the internal tread opposed to the set of rollers on the transmission shafts which defines pitch-line engagement of the gears for driving said second rotatable member, is supported only by the rollers co-operating therewith and is free to turn in opposite directions.

6. A differential transmission device as specified in claim 4, in which the intermeshing gears which drive the second rotatable member comprise an external gear secured thereto and positioned in the space within the set of gears on the transmission shafts with which it engages, and the part on which the internal tread opposed to the set of rollers on the transmission shafts which define pitch-line engagement of the gears for driving said second rotatable member, is supported only by the rollers co-operating therewith and is free to turn in opposite directions and which also comprises a part positioned in the space within the rollers on the transmission shafts contact of which with the internal tread which surrounds said rollers defines pitch-line engagement of the gears which drive the second rotatable member, provided with an external tread the diameter of which is sufficiently less than the diameter of a circle inscribed within and tangent to the associated rollers when in contact with the surrounding internal tread to provide desired clearance between the surfaces of said rollers and said inner external tread.

7. A differential power transmisison device as specified in claim 4, which also comprises parts positioned in the spaces within the different sets of rollers on the transmission shafts, provided with cylindrical external treads, opposed, respectively, to different sets of rollers on said transmission shafts, the diameters of the treads thereon, respectively, being sufficiently less than the diameters of circles inscribed within and tangent to the rollers on the transmisison shafts opposed to the treads on said parts, respectively, when in contact with the internal treads which limit their movement under centrifugal force, to provide desired clearance between said sets of rollers and the external treads on said parts associated with sets of rollers, respectively.

8. A differential power transmission device as specified in claim 4, in which the means for mounting the transmission shafts and for imparting planetary movement thereto about the rotatable members and also on their own axes, comprises bearing members provided with bearings to which said transmission shafts are fitted so as to turn freely, a spider secured to the first rotatable member provided with cradles or recessed seats in its perimeter in which said bearing members are seated and confined, said cradles or recessed seats being constructed and arranged to permit movement of said bearing members and shafts outwardly from said rotatable members under centrifugal force to effect engagement of the rollers on said shafts with the internal treads opposed thereto, respectively.

9. A differential power transmission device as specified in claim 4, in which the means for imparting axial rotation to the transmission shafts comprise gears secured thereto and a gear mounted in fixed position in the space within the gears on said transmission shafts and which intermeshes therewith.

10. A differential power transmission device as specified in claim 4, in which the means for imparting axial rotation to the transmission shafts comprise gears secured thereto and a gear mounted in fixed position in the space within the gears on said transmission shafts and which intermesh therewith, and the driving connection between the transmission shafts and the second rotatable member comprises a set of gears on said transmission shafts and a gear secured to the second rotatable member positioned in the space within the set of gears on said transmission shaft and which intermeshes therewith.

11. A differential power transmission device as specified in claim 4, in which the means for imparting axial rotation to the transmission shafts comprise gears secured thereto and a gear mounted in fixed position in the space within the gears on said transmission shafts and which intermeshes therewith, and the driving connection between the transmission shafts and the second rotatable member comprises a set of gears on said transmission shafts and a gear secured to the second rotatable member in the space within the set of gears on said transmission shaft and which intermeshes therewith, the parts on which the outer internal treads are formed being supported only by the rollers on the transmission shafts with which they are associated, respectively, and being free to turn in opposite directions.

12. A differential power transmission device as specified in claim 4, in which the means for imparting axial rotation to the transmission shafts comprises a set of gears secured thereto and a gear mounted in fixed position in the space within said set of gears and which intermeshes therewith, and the driving connection between the transmission shafts and the second rotatable member comprises a set of gears on said transmission shafts and a gear secured to the second rotatable member positioned in the space within the set of gears on said transmission shaft associated therewith and which intermeshes therewith, the parts on which the outer internal treads are formed being supported only by the rollers on the transmission shafts with which they are associated, respectively, and being free to turn in opposite directions, and which also comprises means for centering said outer internal treads with reference to the first and second rotatable members, respectively.

13. A differential power transmission device as specified in claim 4, in which the means for imparting axial rotation to the transmission shafts comprises sets of gears secured thereto and a gear mounted in fixed position in the space within said set of gears and which intermeshes therewith, and the driving connection between the transmission shafts and the second rotatable member comprises a set of gears on said transmission shafts and a gear secured to the second rotatable member positioned in the space within the set of gears on said transmission shafts associated therewith and which intermeshes therewith, the parts on which the outer internal treads are formed being supported only by the rollers on the transmission shafts with which they are associated, respectively, and being free to turn in opposite directions and which also comprises means for centering said outer internal treads with reference to the first and second rotatable members, said means comprising parts positioned in the spaces within the sets of rollers on said transmission shafts provided with treads opposed to said sets of rollers, the diameters of said treads being sufficiently less than the diameters of circles inscribed within and tangent to the sets of rollers on said transmission shafts when in contact with the outer internal treads opposed thereto, respectively, to provide desired clearance between the treads of said parts and opposed rollers.

In witness that I claim the foregoing as my invention, I affix my signature this 21st day of June, 1928.

JAMES W. LYONS.